(12) United States Patent
Brown

(10) Patent No.: US 8,146,967 B1
(45) Date of Patent: Apr. 3, 2012

(54) ANIMAL DEFECATE COLLECTION APPARATUS

(76) Inventor: Verlon M. Brown, Corona Queens, NY (US)

(*) Notice: Subject to any disclaimer, the term of this patent is extended or adjusted under 35 U.S.C. 154(b) by 400 days.

(21) Appl. No.: 12/543,714

(22) Filed: Aug. 19, 2009

(51) Int. Cl.
*A01K 29/00* (2006.01)
*E01H 1/12* (2006.01)

(52) U.S. Cl. .................................................... 294/1.5

(58) Field of Classification Search .............. 294/1.3, 294/1.4, 1.5, 214; 248/99–101; 15/257.1
See application file for complete search history.

(56) References Cited

U.S. PATENT DOCUMENTS

| | | | |
|---|---|---|---|
| 4,335,678 A | 6/1982 | Garza et al. | |
| 4,363,508 A | 12/1982 | Duke | |
| D417,320 S | 11/1999 | Nunez | |
| 6,062,618 A * | 5/2000 | Figueroa | 294/1.4 |
| 6,471,267 B2 | 10/2002 | Asazuma | |
| 7,198,310 B1 | 4/2007 | Lau | |
| 7,204,532 B2 | 4/2007 | LeFevre | |
| 7,232,165 B2 | 6/2007 | Zelon | |
| 2002/0140240 A1 * | 10/2002 | Charette | 294/1.5 |
| 2004/0201232 A1 | 10/2004 | Borman | |

* cited by examiner

*Primary Examiner* — Dean Kramer

(57) ABSTRACT

The animal defecate collection apparatus provides for hands-free animal feces collection, importantly using any existing flexible bag a user might choose. The apparatus further provides that two sides of any bag surround collected feces. Additionally, the apparatus provides for a user to stand erect in using the apparatus. An additional feature provides for the stalk sections to be easily disengaged so that the stalk length can be reduced to about ⅓ that of the assembled length. The apparatus further provides for a user to collect feces prior to its landing on a given surface, using a relatively wide surface area for collection. Closure of the tines and inner members are in an upward, inner movement, negating any possible contact with feces therebetween.

6 Claims, 5 Drawing Sheets

ANIMAL DEFECATE COLLECTION APPARATUS

BACKGROUND OF THE INVENTION

Various devices are commonly used to collect animal feces, especially in cities requiring it. Two schools of thought divide collection philosophies. The first school of thought proposes that feces be collected after defecation and usually involves a person stooping over with a reversible bag, collecting the feces, then reversing the bag to contain the feces. Only a couple of problems encountered with such practices is that any non-solid feces is difficult to fully collect, and collection is unpleasant. The second school of thought dictates that feces be collected from below the animal prior to the feces landing on a given surface. Various devices proposed for this method of collection require specialized bags for collection. This obviously adds to expense in purchasing and difficulties in locating such bags. An additional problem with such devices is that a single layer of the bag is all that separates the human collector from the feces. Bag failures are known and add both difficulty and extreme unpleasantness.
What has been needed is a semi-automated apparatus that provides for the use of virtually any flexible bag for feces collection while at the same time providing for two layers of such bags to separate the user from the defecate.

FIELD OF THE INVENTION

The animal defecate collection apparatus relates to devices for collecting animal feces and more especially to an electrical, collapsible defecate collection apparatus that provides for feces collection prior to feces contacting a given surface while at the same time providing for the use of non-specialized bags for collection.

SUMMARY OF THE INVENTION

The general purpose of the animal defecate collection apparatus, described subsequently in greater detail, is to provide an animal defecate collection apparatus which has many novel features that result in an improved animal defecate collection apparatus which is not anticipated, rendered obvious, suggested, or even implied by prior art, either alone or in combination thereof.

To attain this, the animal defecate collection apparatus provides for hands-free animal feces collection, importantly using any existing flexible bag a user might choose. The apparatus further provides that two sides of any bag surround collected feces. Additionally, the apparatus provides for a user to stand erect in using the apparatus.
An additional feature provides for the stalk sections to be easily disengaged so that the stalk length can be reduced to about ⅓ that of the assembled length. The apparatus further provides for a user to collect feces prior to its landing on a given surface, using a relatively wide surface area for collection. The electrical operation of the spread and closure of the tines and inner members adds further convenience, without a user having to stoop at any time. Also, closure of the tines and inner members are in an upward, inner movement, negating any possible contact with feces therebetween.

While various means may be employed for raising the inner members and tines upward and toward the center line, the ideal embodiment provides the bi-directional motor with shaft to which the retraction cords are connected. The cords extend from the base, through the inner members, and connect to the tines. One direction of shaft rotation spreads the tines and inner members into a horizontal plane. A counter rotation of the shaft raises the tines and inner members toward the center line, thereby closing a bag.

Thus has been broadly outlined the more important features of the improved animal defecate collection apparatus so that the detailed description thereof that follows may be better understood and in order that the present contribution to the art may be better appreciated.

An object of the animal defecate collection apparatus is to collect animal defecate prior to ground contact.

Another object of the animal defecate collection apparatus is to provide a relatively wide surface for defecate collection.

Another object of the animal defecate collection apparatus is to provide hands free defecate collection.

A further object of the animal defecate collection apparatus is to provide for the use of non-specialized bags in collecting the animal defecate.

An added object of the animal defecate collection apparatus is to provide hand-switch opening and closing of the collection bag.

And, an object of the animal defecate collection apparatus is to prevent bag damage.

Still another object of the animal defecate collection apparatus is to provide two bag layers in supporting and surrounding collected feces.

Yet another object of the animal defecate collection apparatus is to collapse to a size about ⅓ the expanded size.

These together with additional objects, features and advantages of the improved animal defecate collection apparatus will be readily apparent to those of ordinary skill in the art upon reading the following detailed description of presently preferred, but nonetheless illustrative, embodiments of the improved animal defecate collection apparatus when taken in conjunction with the accompanying drawings.

In this respect, before explaining the current embodiments of the improved animal defecate collection apparatus in detail, it is to be understood that the animal defecate collection apparatus is not limited in its application to the details of construction and arrangements of the components set forth in the following description or illustration.
Those skilled in the art will appreciate that the concept of this disclosure may be readily utilized as a basis for the design of other structures, methods, and systems for carrying out the several purposes of the improved animal defecate collection apparatus. It is therefore important that the claims be regarded as including such equivalent constructions insofar as they do not depart from the spirit and scope of the animal defecate collection apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the animal defecate collection apparatus generally designated by the reference number 10 will be described.

Figure 1:
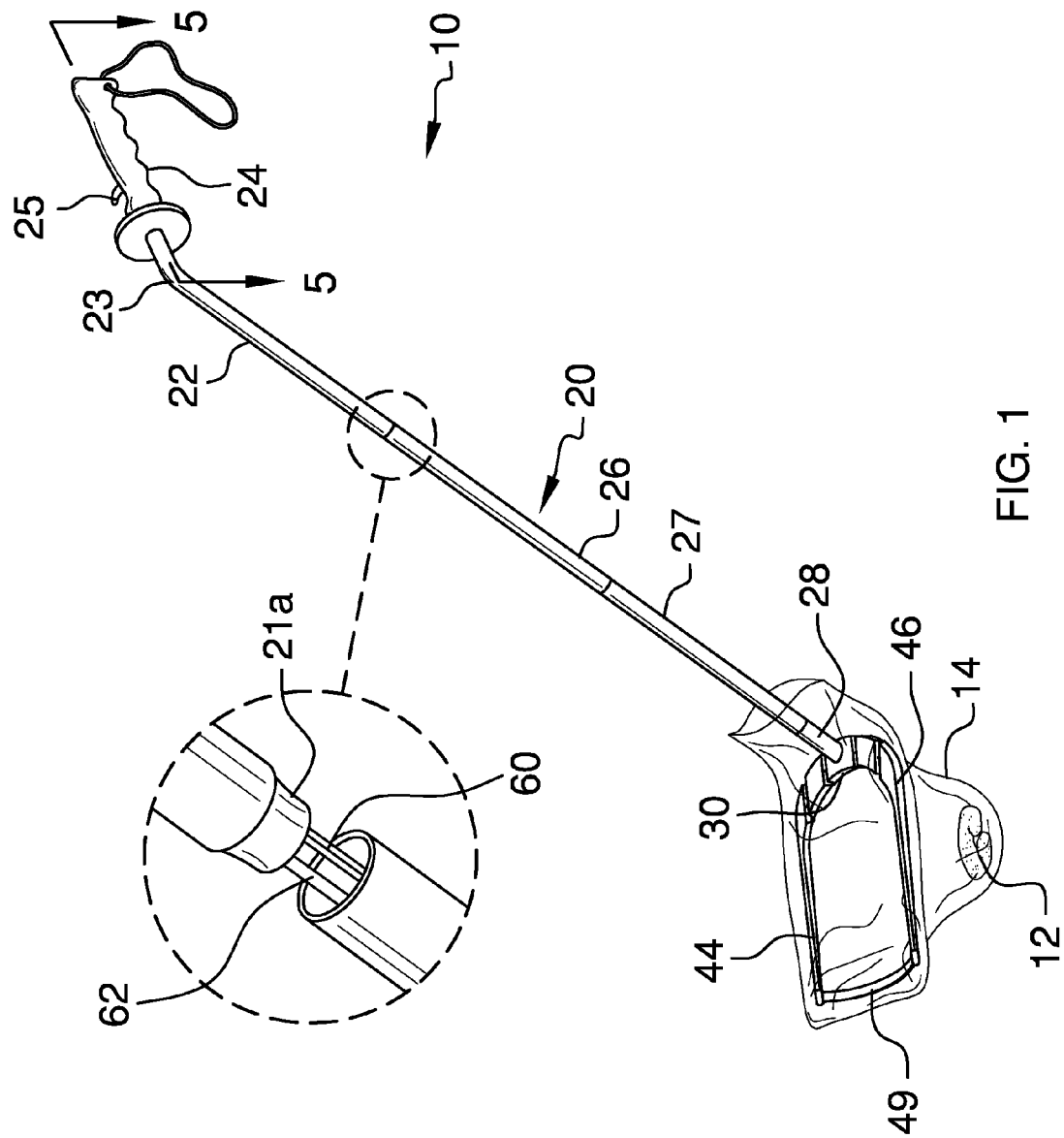
FIG. 1 is a perspective view of the apparatus in use, bag open.
Figure 3:
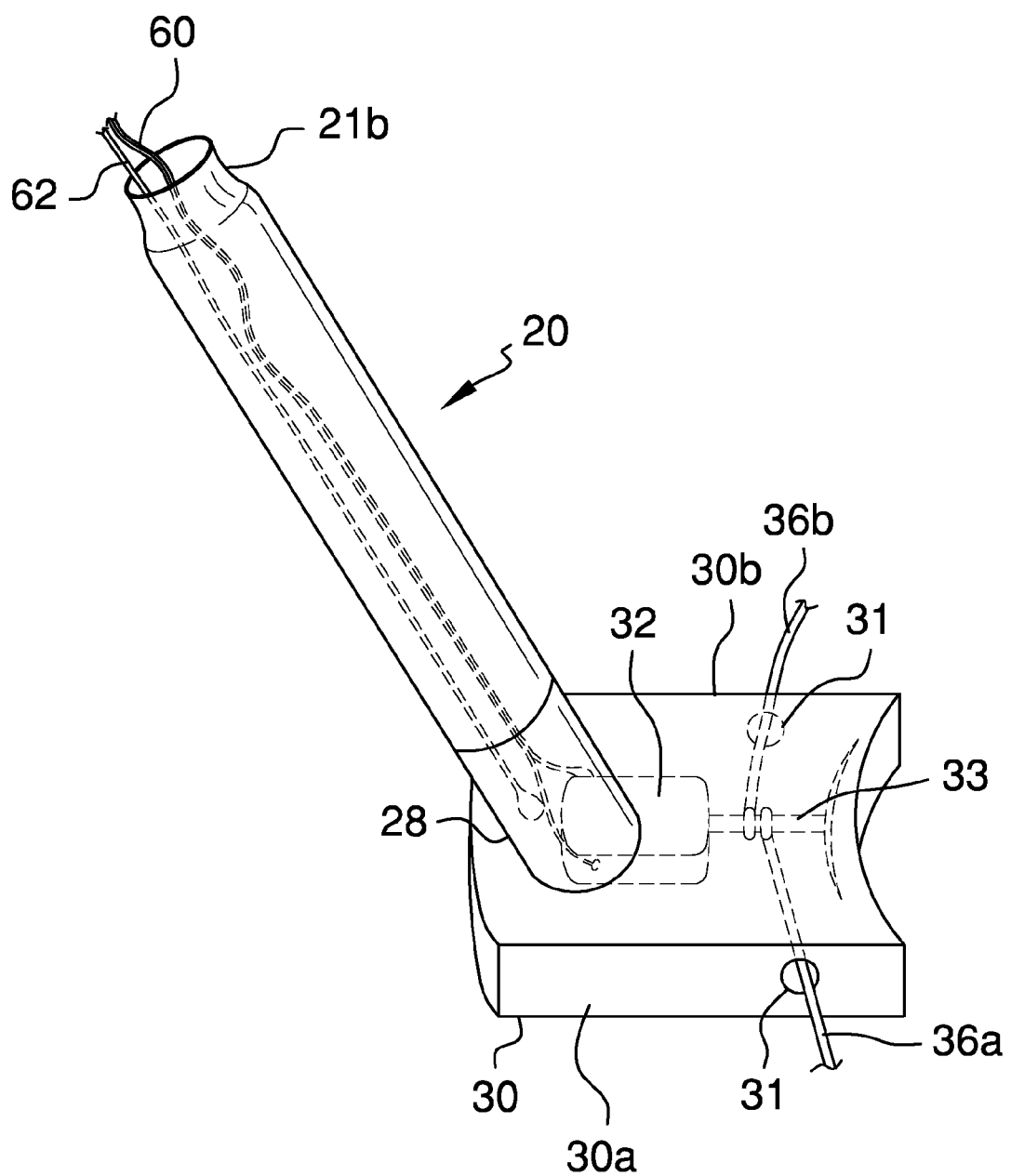
FIG. 3 is a perspective view of the stalk third section connected to the bottom that is connected to the base with motor and battery within, the retraction cord affixed to the motor shaft.
Figure 4:
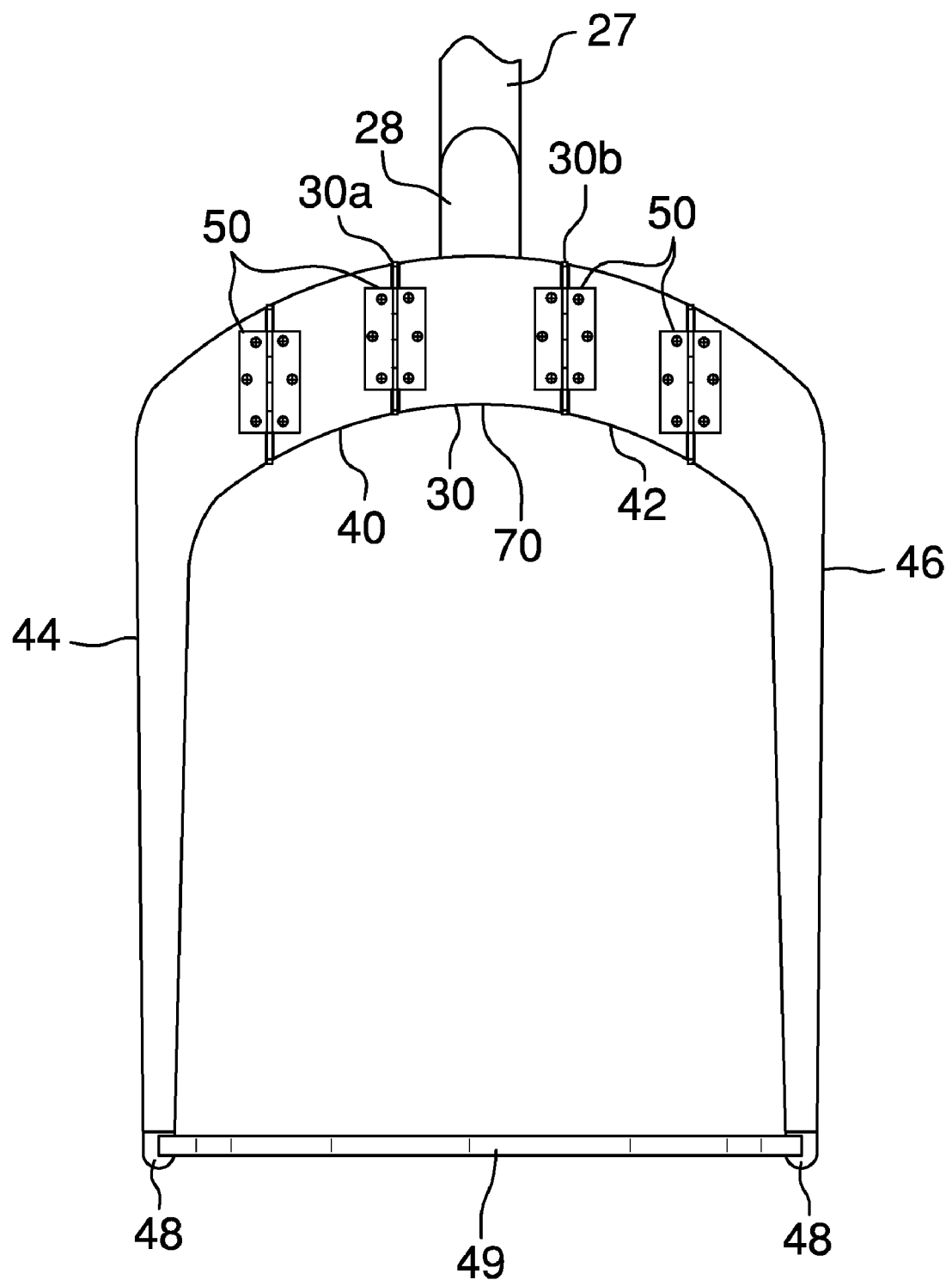
FIG. 4 is a top plan view of the base hingedly attached to the first and second inner members, which are hingedly attached to the first and second tines, respectively.

Referring to FIGS. 1, 3, and 4, the apparatus 10 partially comprises the collapsible hollow stalk 20 having a first section 22, a second section 26, and a third section 27. The bend 23 is disposed upwardly on the first section 22. The handle 24 is fitted above the bend 23. The trigger switch 25 is disposed within the handle 24. The hollow bottom 28 is extended downwardly from the third section 27. The first reduction 21a is disposed downwardly on the first section 22. The first reduction 21a is removably inserted into the second section 26. The second reduction 21b is disposed atop the third section 27. The second reduction 21b is removably inserted into second section 26.

Figure 5:
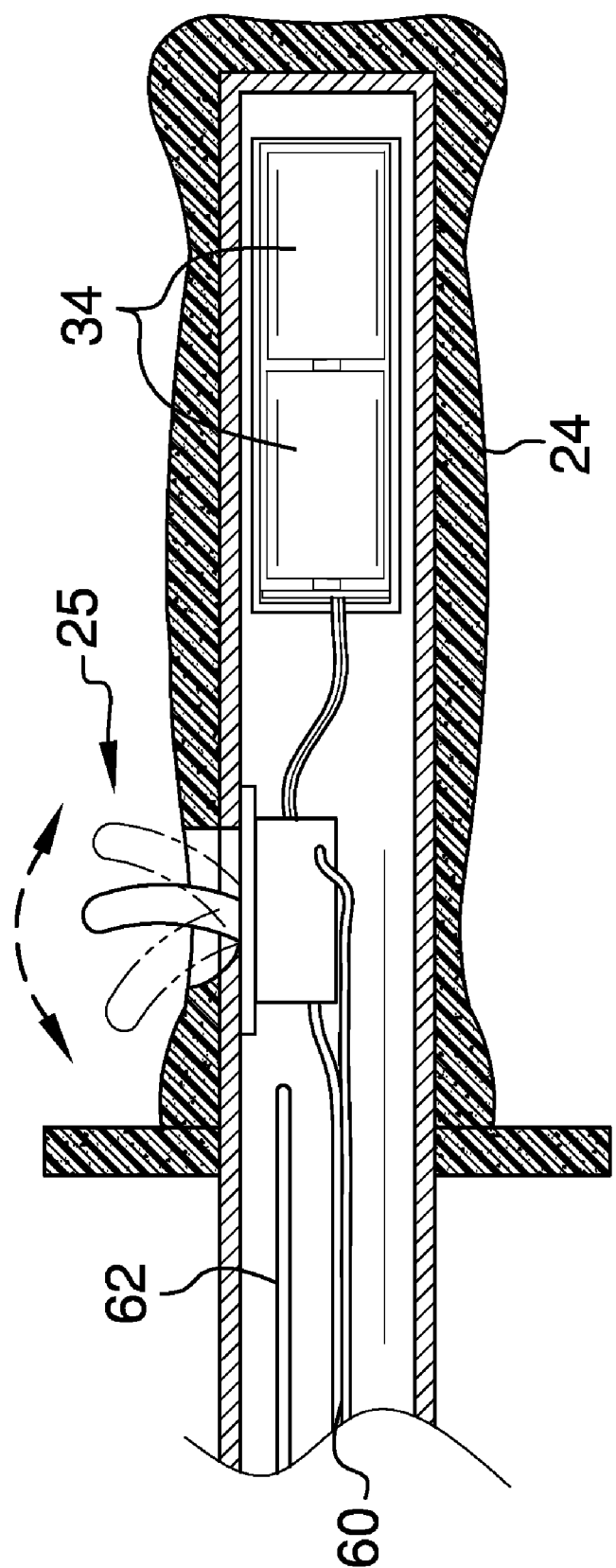
FIG. 5 is a lateral cross sectional view of the handle.

Continuing to refer to FIGS. 1 and 4 and referring also to FIG. 5, the elastic stalk band 62 is disposed within the first section 22, the second section 26, and the third section 27. The elastic stalk band 62 is anchored within the handle 24 and within the bottom 28. The elastic stalk band 62 serves to keep the stalk 20 sections together until overcome by a user in separating the sections so that the stalk can be pulled apart and collapsed to about ⅓ its assembled extended length.

Referring to FIG. 3, the hollow base 30 is connected angularly to the bottom 28. The base 30 has a first side 30a spaced apart from a second side 30b. The base 30 further comprises the bi-directional electric motor 32 having a first rotation and an opposite second rotation. The rotating horizontal shaft 33 is extended from the electric motor 32. The battery 34 is in communication with the motor 32. The battery 34, motor 32, and trigger switch 25 are in communication via the electric wiring 60. An orifice 31 is disposed in both the first side 30a and second side 30b of the hollow base 30. The pair of opposed identical inner members comprises the first inner member 40 laterally attached via hinge 50 to the base 30 first side 30a and the second inner member 42 laterally attached via hinge 50 to the base 30 second side 30b. An orifice (not shown) is disposed laterally through each inner member. The pair of opposed tines comprises the first tine 44 laterally attached via hinge 50 to the first inner member 40 and the second tine 46 laterally attached via hinge 50 to the second inner member 42. Each tine further extends horizontally and distally from the base 30 and the inner members. A rounded end 48 distally terminates each tine. The rounded ends 48 are important in negating damage to any existing bag 14 used with the apparatus 10. The elastic band 49 connects the rounded ends 48. An orifice (not shown) is disposed medially within each tine. The pair of retraction cords comprises the first retraction cord 36a and the second retraction cord 36b. The first retraction cord 36a is connected to the rotating shaft 33 and extended through the base 30 first side 30a orifice 31, he first inner member 40 orifice, and into the first tine 44 orifice. The first retraction cord 36a is connected to the first tine 44.

The second retraction cord 36b is connected to the rotating shaft 33 and extended through the base 30 second side 30b orifice 31, the second inner member 42 orifice, and into the second tine 46 orifice. The second retraction cord 36b is connected to the second tine 46.

Figure 2:
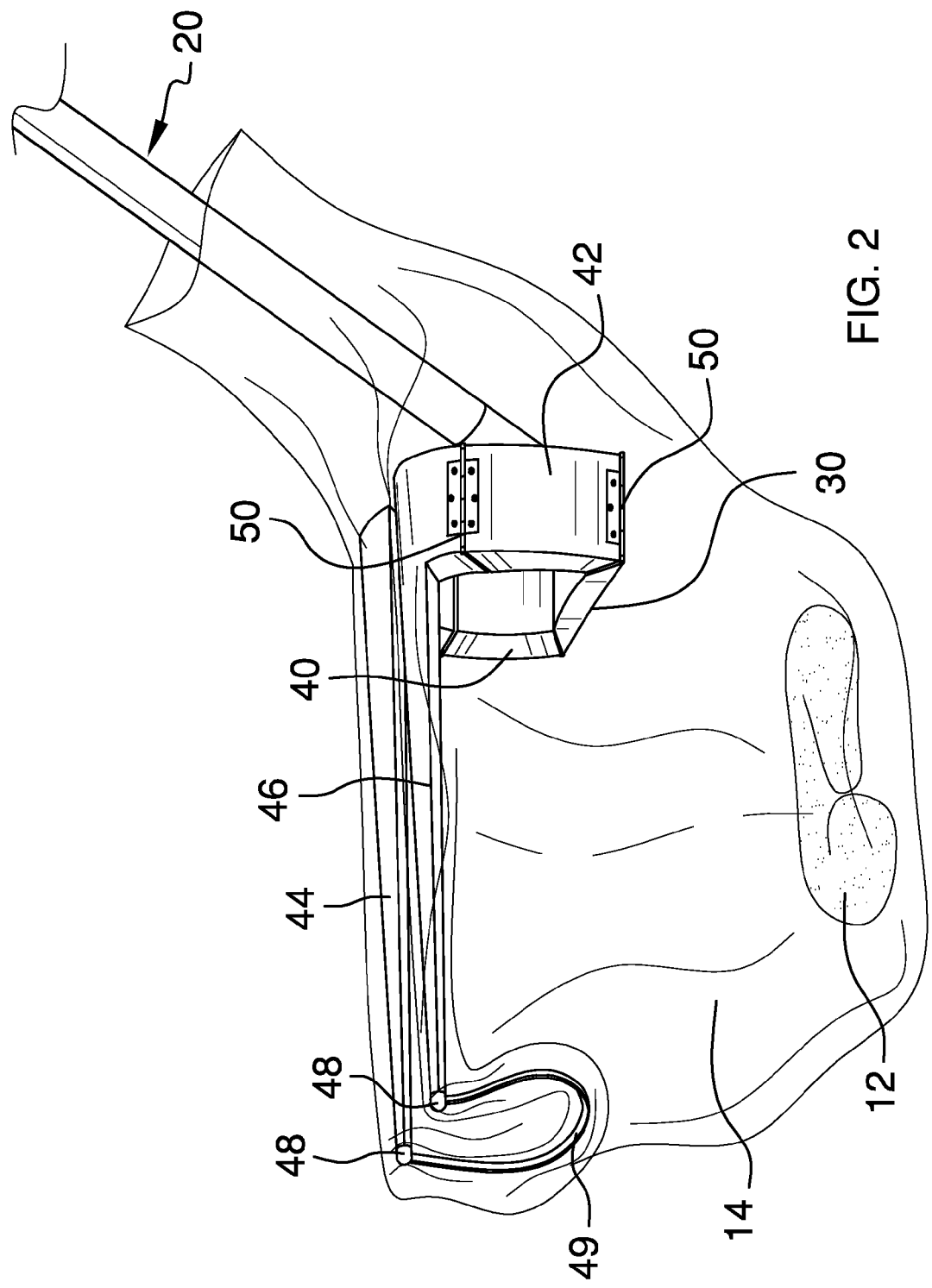
FIG. 2 is a perspective view of the apparatus in use, bag closed.

Referring to FIGS. 1, 2, and 3, a first rotation of the bi-directional motor 32 shaft 33 moves the inner members and the tines outwardly and downward into a horizontal plane. The opposite second rotation of the bi-directional motor 32 shaft 33 moves the inner members and tines upwardly and inwardly toward the center line 70, allowing both easy bag 14 installation as well as bag 14 closure. The trigger switch 25 controls the first and second motor 32 shaft 33 rotations. It is important to note that virtually any flexible bag 14 can be used with the apparatus 10, negating the need for expensive and more difficult to find and manufacture custom bags 14. It is further important to note that the bag 14 closure results in a more pleasant-to-use apparatus 10 with regard to sight and smell of feces 12.

Continuing to view FIGS. 1 and 2, the bag 14 is ideally fitted to the tines and partially around the stalk 20. With the tines spread, the bag 14 is held under an animal prior to defecation. The tines are importantly spaced apart about 7 inches when spread outwardly and downwardly, along with the inner members, into a co-horizontal plane. An advantage lies in the fact that bags 14 used with the apparatus 10 provide a double wall of thickness surrounding the feces 12. After feces 12 collection, the trigger switch 25 is used to close the bag 14. Disposal of the bag 14 and feces 12 is at a user's convenience.

With respect to the above description then, it is to be realized that the optimum dimensional relationships for the parts of the animal defecate collection apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the animal defecate collection apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the animal defecate collection apparatus may be used.

Therefore, the foregoing is considered as illustrative only of the principles of the animal defecate collection apparatus. Further, since numerous modifications and changes will readily occur to those skilled in the art, it is not desired to limit the animal defecate collection apparatus to the exact construction and operation shown and described, and accordingly, all suitable modifications and equivalents may be resorted to, falling within the scope of the animal defecate collection apparatus.

What is claimed is:

1. An animal defecate collection apparatus, comprising, in combination:
   a collapsible hollow stalk having a first section, a second section, and a third section;
   a bend disposed upwardly on the first section;
   a handle fitted above the bend;
   a trigger switch disposed within the handle;
   a hollow bottom extended downwardly from the third section;
   a first reduction disposed downwardly on the first section, the first reduction removably inserted into the second section;
   a second reduction disposed atop the third section, the second reduction removably inserted into second section;
   an elastic stalk band disposed within the first section, the second section and the third section, the elastic stalk band anchored within the handle and within the bottom;

a hollow base connected angularly to the bottom, the base having a first side spaced apart from a second side, the base further comprising:
a pair of opposed identical inner members, the first inner member laterally hingedly attached to the base first side, the second inner member laterally hingedly attached to the base second side;
an orifice disposed laterally through each inner member;
a pair of opposed tines, the first tine laterally hingedly attached to the first inner member, the second tine laterally hingedly attached to the second inner member, each tine further extended horizontally and distally from the base and the inner members;
a rounded end distally terminating each tine;
an elastic band connecting the rounded ends;
means for opening the tines and inner members into a horizontal plane;
means for closing the tines and inner members upwardly and inwardly.

2. The apparatus according to claim 1 wherein the means for opening and closing the tines and inner members further comprises an electrical means.

3. The apparatus according to claim 2 wherein the tines are further about 7 inches apart with the tines and inner members disposed outwardly downward into the horizontal plane.

4. The apparatus according to claim 1 wherein the tines are further about 7 inches apart with the tines and inner members disposed outwardly downward into the horizontal plane.

5. An animal defecate collection apparatus, comprising, in combination:
a collapsible hollow stalk having a first section, a second section, and a third section;
a bend disposed upwardly on the first section;
a handle fitted above the bend;
a trigger switch disposed within the handle;
a hollow bottom extended downwardly from the third section;
a first reduction disposed downwardly on the first section, the first reduction removably inserted into the second section;
a second reduction disposed atop the third section, the second reduction removably inserted into second section;
an elastic stalk band disposed within the first section, the second section and the third section, the elastic stalk band anchored within the handle and within the bottom;
a hollow base connected angularly to the bottom, the base having a first side spaced apart from a second side, the base further comprising:
a bi-directional electric motor comprising a first rotation and an opposite second rotation;
a rotating horizontal shaft extended from the electric motor;
a battery in communication with the motor, the battery, motor, and trigger switch in communication via an electric wiring;
an orifice in both the first side and second side of the hollow base;
a pair of opposed identical inner members, the first inner member laterally hingedly attached to the base first side, the second inner member laterally hingedly attached to the base second side;
an orifice disposed laterally through each inner member;
a pair of opposed tines, the first tine laterally hingedly attached to the first inner member, the second tine laterally hingedly attached to the second inner member, each tine further extended horizontally and distally from the base and the inner members;
a rounded end distally terminating each tine;
an elastic band connecting the rounded ends;
an orifice disposed medially within each tine;
a pair of retraction cords, the first retraction cord connected to the rotating shaft and extended through the base first side orifice, the first inner member orifice, and into the first tine orifice, the first retraction cord connected to the first tine, the second retraction cord connected to the rotating shaft and extended through the base second side orifice, the second inner member orifice, and into the second tine orifice, the second retraction cord connected to the second tine;
whereby a first rotation of the bi-directional motor shaft moves the inner members and the tines outwardly downward into a horizontal plane, a second rotation of the bi-directional motor shaft moves the inner members and tines upwardly and inwardly toward as center line.

6. The apparatus according to claim 5 wherein the tines are further about 7 inches apart with the tines and inner members disposed outwardly downward into the horizontal plane.

* * * * *